United States Patent
Hayaishi

(10) Patent No.: US 7,570,391 B2
(45) Date of Patent: Aug. 4, 2009

(54) IMAGE PROCESSING ACCORDING TO IMAGE OUTPUT MODE

(75) Inventor: Ikuo Hayaishi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 886 days.

(21) Appl. No.: 10/916,337

(22) Filed: Aug. 10, 2004

(65) Prior Publication Data

US 2005/0062993 A1 Mar. 24, 2005

(30) Foreign Application Priority Data

Aug. 11, 2003 (JP) ............................. 2003-291322

(51) Int. Cl.
*H04N 1/40* (2006.01)
(52) U.S. Cl. ...................... 358/1.9; 358/1.16
(58) Field of Classification Search ................ 358/1.9, 358/2.1, 406, 504, 1.15–1.18, 468
See application file for complete search history.

(56) References Cited

U.S. PATENT DOCUMENTS

| | | | | |
|---|---|---|---|---|
| 5,929,892 A * | 7/1999 | Towner et al. | ............... | 347/255 |
| 5,992,964 A * | 11/1999 | Yamaguchi | ............... | 347/23 |
| 6,040,927 A * | 3/2000 | Winter et al. | ............... | 358/534 |
| 6,398,333 B1 * | 6/2002 | Mulay et al. | ............... | 347/14 |
| 6,798,538 B1 * | 9/2004 | Yamada et al. | ............... | 358/1.9 |

FOREIGN PATENT DOCUMENTS

| | | |
|---|---|---|
| JP | 03-272272 | 12/1991 |
| JP | 05-313450 | 11/1993 |
| JP | 11-120325 | 4/1999 |
| JP | 2001-249814 | 9/2001 |
| JP | 2002-029120 | 1/2002 |
| JP | 2002-094712 | 3/2002 |
| JP | 2002-101301 | 4/2002 |
| JP | 2002-204326 | 7/2002 |

OTHER PUBLICATIONS

Micrografx Picture Publisher Reference Guide, copyright 1992, pp. 7-10-7-23.*
Abstract of Japanese Patent Publication No. 11-120325, Pub. Date: Apr. 30, 1999, Patent Abstracts of Japan.
Abstract of Japanese Patent Publication No. 03-272272, Pub. Date: Dec. 3, 1991, Patent Abstracts of Japan.
Abstract of Japanese Patent Publication No. 05-313450, Pub. Date: Nov. 26, 1993, Patent Abstracts of Japan.
Abstract of Japanese Patent Publication No. 2001-249814, Pub. Date: Sep. 14, 2001, Patent Abstracts of Japan.
Abstract of Japanese Patent Publication No. 2002-029120, Pub. Date: Jan. 29, 2002, Patent Abstracts of Japan.
Abstract of Japanese Patent Publication No. 2002-094712, Pub. Date: Mar. 29, 2002, Patent Abstracts of Japan.
Abstract of Japanese Patent Publication No. 2002-101301, Pub. Date: Apr. 5, 2002, Patent Abstracts of Japan.
Abstract of Japanese Patent Publication No. 2002-204326, Pub. Date: Jul. 19, 2002, Patent Abstracts of Japan.

* cited by examiner

*Primary Examiner*—Thomas D Lee
*Assistant Examiner*—Stephen M Brinich
(74) *Attorney, Agent, or Firm*—Martine Penilla & Gencarella, LLP

(57) ABSTRACT

Picture quality adjustment processing is executed using picture quality adjustment parameter value sets corresponding to a plurality of output modes. First and second image processing modules can execute same picture quality adjustment, and they can utilize picture quality adjustment parameters in common. If picture quality adjustment is executed by the first image processing module, picture quality adjustment by the second image processing module is prohibited.

16 Claims, 12 Drawing Sheets

Fig.3(a)

| | Color Space | | | | | |
|---|---|---|---|---|---|---|
| | sRGB (standard) | | | eRGB | | |
| | Picture Quality Adjustment Mode | | | Picture Quality Adjustment Mode | | |
| | Standard | Portrait | Landscape | Standard | Portrait | Landscape |
| Print Medium — Glossy Paper | PS1 | PS3 | PS5 | PS7 | PS9 | PS11 |
| Print Medium — Plain Paper | PS2 | PS4 | PS6 | PS8 | PS10 | PS12 |

| | | Standard | Portrait | Landscape |
|---|---|---|---|---|
| Glossy Paper | Lightness | LV3 | LV4 | LV2 |
| | Contrast | LV3 | LV2 | LV4 |
| | Memory Color | OFF | Skin Tone | Sky Blue, Green |
| | Sharpness | LV3 | LV2 | LV4 |
| Plain Paper | Lightness | LV3 | LV4 | LV2 |
| | Contrast | LV4 | LV3 | LV5 |
| | Memory Color | OFF | Skin Tone | Sky Blue, Green |
| | Sharpness | LV4 | LV3 | LV5 |

PS2, PS4, PS6

Before Normalization

After Normalization

Fig.7

Picture Quality Adjustment Control Information Setting Screen

Printer Paper
☑ Glossy Paper  ☐ Plain Paper

Picture Quality Adjustment Mode
☐ Standard   ☐ Portrait   ☑ Landscape

Fig.8

Picture Quality Adjustment Control Information Setting Screen

Printer Paper
☑ Glossy Paper  ☐ Plain Paper

Ink Set
☐ 4 color   ☑ 8 color

Picture Quality Adjustment Mode
☐ Standard   ☐ Portrait   ☑ Landscape

IMAGE PROCESSING ACCORDING TO IMAGE OUTPUT MODE

BACKGROUND OF THE INVENTION

1. Field of the Invention

This invention relates to a technique for outputting images based on image data.

2. Description of the Related Art

Images shot with image generating devices such as digital still cameras or digital video cameras are output (e.g. displayed or printed) by output devices of various kinds, such as monitors and printers. Using image retouching application, picture quality of an output image can be adjusted in any desired manner on a personal computer. An image retouching application typically includes a picture quality adjusting function for automatically adjusting picture quality of image data; utilizing such a picture quality adjusting function, it is possible to improve picture quality of an image output from an image output device. The printer driver, which controls operation of one type of image output device, namely a printer, also includes a function for adjusting picture quality, and it is possible utilizing such a printer driver to improve picture quality of printed images as well (for example, JP11-120325A).

Among printers that produce images on a print media, there are those that can utilize a number of types of print media, such as glossy paper and plain paper. Among printers that eject ink onto a print medium to form an image, there are those in which the type of ink ejected can be exchanged. Also, devices of various kinds can be utilized as printers.

Color reproduction in images output in such various different modes may in some instances differ according to mode. Thus, an unvarying picture quality adjustment process will not always provide appropriate adjustment of picture quality, depending on the output mode of the image.

SUMMARY OF THE INVENTION

An object of the present invention is to provide a technique whereby picture quality may be adjusted appropriately regardless of the output mode of an image.

According to one aspect of the present invention, there is provided a first image processing device for processing target image data representing a target image, for the purpose of outputting the target image according to any of a plurality of output modes that are dependent at least upon a print medium to be used. The image processing device comprises: a memory having pre-stored therein separately from the target image data a parameter file that stores a plurality of parameter value sets in association with the plurality of output modes, respectively, each parameter value set including a plurality of picture quality adjustment parameters; a parameter value acquiring module configured to acquire one parameter value set from the parameter file according to output mode information indicating one output mode to be used at the output of the target image; and a picture quality adjusting module configured to execute picture quality adjustment of the target image data, using the acquired parameter value set.

With this first image processing device, since it is possible to use a parameter file containing parameter value sets associated with plural image output modes, picture quality adjustment can be carried out with reference to the image output mode to be used. Accordingly, picture quality adjustment can be carried out appropriately for any output mode of the image.

According to another aspect of the present invention, there is provided a second image processing device for processing target image data representing a target image, for the purpose of outputting the target image according to any of a plurality of output modes that are dependent at least upon a print medium to be used. The image processing device comprises: a first image processing module comprising a first picture quality adjusting module; a second image processing module comprising a second picture quality adjusting module identical to the first picture quality adjusting module; and a memory, accessible from the first and second image processing modules, for pre-storing a parameter file separately from the target image data, the parameter file storing a plurality of parameter value sets in association with the plurality of output modes, respectively, each parameter value set including a plurality of picture quality adjustment parameters. The first image processing module executes a process utilizing the target image data as a processing target to create intermediate image data, and the second image processing module executes a process utilizing the intermediate image data as a processing target. The second image processing module prohibits or halts execution of picture quality adjustment by the second picture quality adjusting module if the first image processing module has executed picture quality adjustment by the first picture quality adjusting module.

In this second image processing device, first and second image processing modules are able to execute picture quality adjustment using in common a parameter value set corresponding to an image output mode to be used; and in the event that the first image processing module has executed picture quality adjustment, execution of picture quality adjustment by the second image processing module is halted or prohibited. Accordingly, it is possible to adjust picture quality appropriately with reference to the image output mode while avoiding reduplicative picture quality adjustment.

The present invention may be realized in various modes, for example, an image processing method and image processing device; a computer program for realizing the functions of such a method or device; or a storage medium having such a computer program stored thereon.

These and other objects, features, aspects, and advantages of the present invention will become more apparent from the following detailed description of the preferred embodiments with the accompanying drawings.

BRIEF DESCRIPTION OF THE DRAWINGS

FIGS. 3(a) and 3(b) illustrate an example of arrangement of parameter file 400.

FIG. 7 illustrates an exemplary screen for setting picture quality adjustment control information.

FIG. 8 illustrates an exemplary screen for setting picture quality adjustment control information.

FIG. 9 is a block diagram of the arrangement of a computer 90a.

FIG. 15 illustrates an example of execution of a picture quality adjustment process by a control circuit 22a of a printer 20a.

DESCRIPTION OF THE PREFERRED EMBODIMENT

The embodiments of the invention are described hereinbelow in the following order.
A. Device Arrangement
B. Embodiment 1:
C. Embodiment 2:
D. Embodiment 3:
E. Embodiment 4:
F. Embodiment 5:
G. Variations

A. DEVICE ARRANGEMENT

Figure 1:
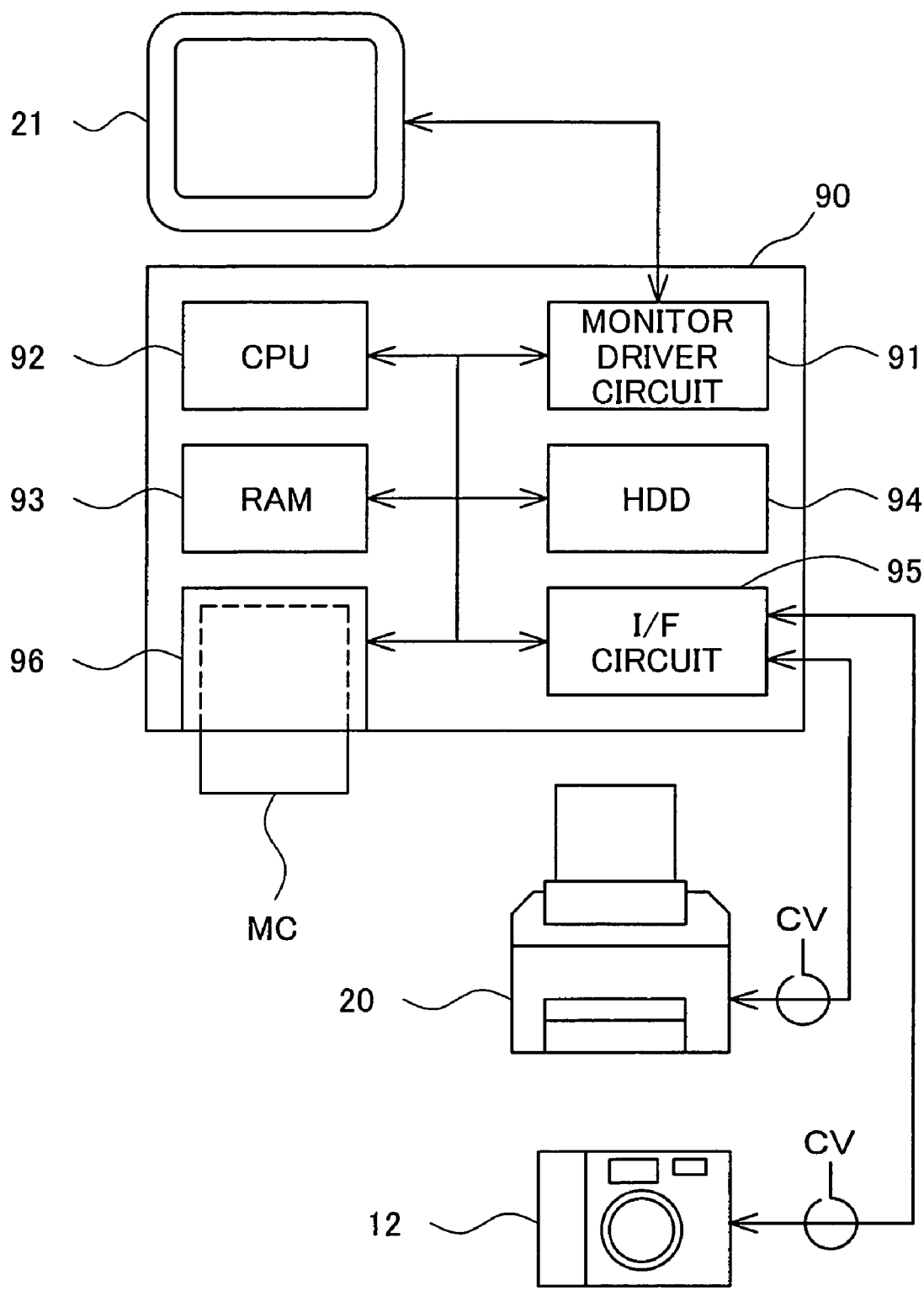
FIG. 1 is a block diagram showing an arrangement of an image output system.

FIG. 1 is a block diagram showing an arrangement of an image output system embodying the present invention. This image output system comprises a printer 20 as an image output device for outputting images (corresponding to the image output unit in the invention), and a computer 90 as an image processing device. Computer 90 is a computer of the type commonly used, and executes picture quality adjustment processing, described later. The combination of computer 90 serving as the image processing device and the printer 20 serving as the image output device may be referred to as "image output apparatus" in the broad sense.

Computer 90 comprises a CPU 92 for executing a picture quality adjustment process, described later; RAM 93 for temporary storage of results of operations by CPU 92, image data, and the like; and a hard disk drive (HDD) 94 for storing a picture quality adjustment processing program, image data, and other data required for picture quality adjustment processing. The computer 90 additionally comprises a memory card slot 96 for inserting a memory card MC and acquiring data from the memory card MC; a monitor driver circuit 91 for driving a monitor 21; and an I/F circuit 95 for interfacing with printer 20, digital camera 12, or other device.

Digital camera 12 functions as an image generating device for generating image data. Computer 90 can acquire image data generated by digital camera 12, via a cable CV for example. An arrangement whereby digital camera 12 can stores image data on a memory card MC and computer 90 acquires image data from the memory card MC is also possible. Also possible is an arrangement whereby image data is acquired over a network (not shown). The image generating device is not limited to a digital camera 12; a scanner or other device that generate image data could be used as well.

When an image data processing program, namely an image retouching application or printer driver, is run under user control, CPU 92 executes a picture quality adjustment process to adjust the quality of the image data (described in detail hereinbelow).

CPU 92 generates print data on the basis of the quality-adjusted image data, and sends the generated print data to printer 20. Printer 20, having received the print data, ejects ink from nozzles onto a print medium (also referred to as printer paper) in accordance with the print data to output (in this case, to print) the image. Printer 20 has a number of constitutional elements that fall outside of the scope of the description herein, such as a main scanning drive mechanism, sub-scanning drive mechanism, print head, print head drive circuit, control circuit and so on.

B. EMBODIMENT 1

Figure 2:
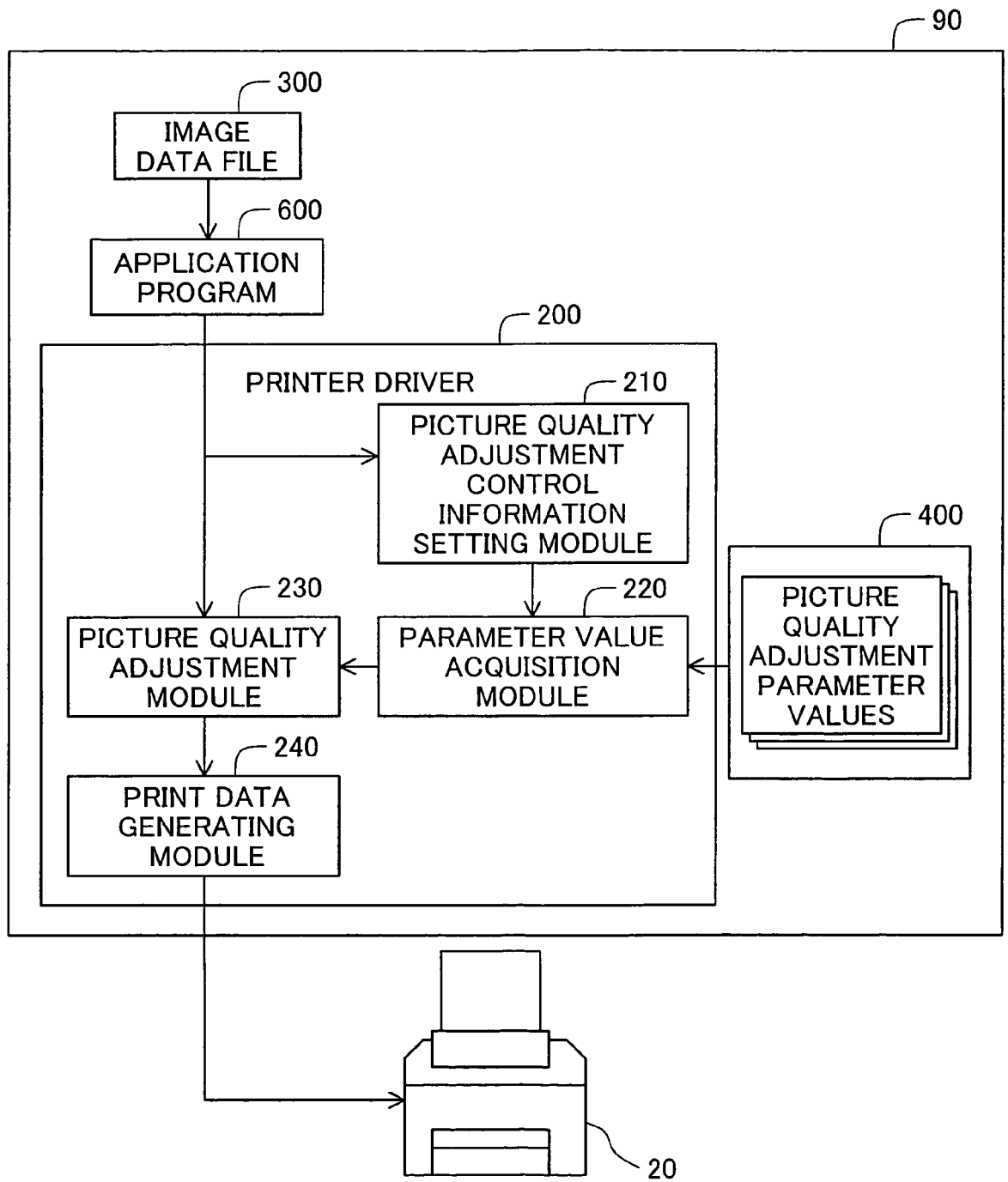
FIG. 2 is a block diagram showing arrangement of computer 90 in Embodiment 1.

B1. Arrangement of Computer:

FIG. 2 is a block diagram showing the arrangement of computer 90 in Embodiment 1. Computer 90 comprises an image processing application 600, a printer driver 200, and a parameter file 400. The printer driver 200 comprises a picture quality adjustment control information setting module 210, a parameter value acquisition module 220, a picture quality adjustment module 230, and a print data generating module 240. The functions of the image processing application 600 and printer driver 200 are realized by means of CPU 92 (FIG. 1) executing the software (computer program) installed on computer 90.

Parameter file 400 has stored in it a plurality of picture quality adjustment parameter values, and when installed is recorded as a data file on HDD 94 (FIG. 1). Picture quality adjustment parameter values are read in by parameter value acquisition module 220 (described in detail hereinbelow). Here, parameter file 400 is recorded on HDD 94 in such a way as to be readable by parameter value acquisition module 220. For example, there are systems in which data file management is carried out through association with a directory of hierarchical architecture. Where such a system is used, the parameter file 400 may be recorded as a data file associated with a predetermined specific directory, and having a predetermined name. Alternatively, the file name and related directory may be registered in the system's information database (also termed the system directory). In this Embodiment, HDD 94 corresponds to the "memory" taught in the invention.

The image processing application 600 reads in image data from an image data file 300 generated by digital camera 12 or other image generating device. In the event of a user-issued print command to image processing application 600, the image data is sent to printer driver 200.

Image data generated by an image generating device is typically in compressed data format (for example, JPEG compressed data). When handling such compressed data, the image processing application 600 performs decompression of the image data and sends the decompressed image data to the printer driver 200. In some instances, the color space representing the image data will not be a color space that can be handled by the printer driver 200. For example, as is commonly known, JPEG compressed data is represented in a YCbCr color space. Here, where the printer driver 200 can handle image data represented in an RGB color space, the image processing application 600 will execute a color space conversion process to convert from the YCbCr color space to the RGB color space and send the color space-converted image data to the printer driver 200. Here, the process of conversion from the YCbCr color space to the RGB color space can be executed on the basis of a predetermined standard matrix.

This decompression process and/or color space conversion process may be executed by the printer driver 200 rather than by the image processing application 600.

The picture quality adjustment module 230 of printer driver 200 executes a picture quality adjustment process, carried out according to a picture quality adjustment value, on the image data received from the image processing application 600 (described in detail later). The print data generating module 240 then generates print data according to the image data which has been subjected to picture quality adjustment.

B2. Arrangement of Picture Quality Adjustment Parameter Values:

FIGS. 3(a) and 3(b) illustrate an example of the arrangement of parameter file 400. FIG. 3(a) shows an overview of the arrangement of parameter file 400, and FIG. 3(b) shows exemplary parameter data.

In this Embodiment, picture quality adjustment module 230 (FIG. 2) is able to execute, by way of picture quality adjustment processes, a brightness adjustment process, a contrast adjustment process, a memory color adjustment process, and a sharpness adjustment process. The picture quality adjustment module 230 executes these adjustment processes on the basis of picture quality adjustment parameter values for these processes. Parameter file 400 stores a plurality of picture quality adjustment parameter values for the adjustment processes (hereinafter referred to as a picture quality adjustment parameter value sets). The picture quality adjustment processes executed by the module 230 are not limited to those listed above, and may include various other adjustment processes. For example, a saturation adjustment process or color balance adjustment process could be executed. In general, any process for adjusting picture quality is acceptable.

In the example of FIG. 3(a), parameter file 400 contains 12 picture quality adjustment parameter value sets PS1-PS12. These picture quality adjustment parameter value sets PS1-PS12 have been prepared according to picture quality adjustment mode, type of print medium useable for printing, and color space relating to image data.

In this Embodiment, printer driver 200 has three picture quality adjustment modes ("standard mode", "portrait mode" and "landscape mode") which are suitable for different types of image subjects for output. In the example of FIG. 3(a), picture quality adjustment parameter value sets are prepared separately for the picture quality adjustment modes. By so doing, it becomes possible to use different picture quality adjustment parameter value sets according to the type of image, so that a picture quality adjustment process appropriate for a particular type of image may be executed. Picture quality adjustment modes are not limited to the three types listed above; generally, a number of modes according to different subject types may be prepared.

In this Embodiment, printer 20 is able to use both "glossy paper" and "plain paper" as the print medium. Plain paper tends to have weaker ink coloration and greater tendency to bleed than does glossy paper. As a result, when using plain paper, it is possible that images with low contrast and blurriness (i.e. not sharp) will be output, as compared to the case where glossy paper is used. Generally, not only contrast and sharpness, but also color reproduction in printed images can vary with the type of print medium. As a result, where an unvarying picture quality adjustment process is carried out irrespective of the type of print medium, it is possible that the desired picture quality will not be obtained, depending on the type of print medium. Accordingly, in the example shown in FIG. 3(a), picture quality adjustment parameter value sets for different types of print media are prepared. By so doing, since it is possible to use different picture quality adjustment parameter value sets for different types of print media, a picture quality adjustment process appropriate for a particular type of print medium can be executed. Types of print media useable by printer 20 are not limited to the two listed above, it being possible to use any of a number of kinds of print media.

In this Embodiment, different picture quality adjustment parameter value sets are prepared for the different color spaces relating to image data. Image data generated by an image generating device typically assumes that the data will processed in a standard color space (for example, an RGB color space). Depending on the image generating device, image data may be generated on the assumption of being processed in some other specific color space having a color reproduction range different from the standard color space. For a given subject, where the assumed color spaces, i.e. color reproduction ranges of color spaces associated with image data, differ, there exists the possibility that when the generated image data is reproduced, colors will differ from expected. As a result, where an unvarying picture quality adjustment process is carried out irrespective of the associated color space, it is possible that, depending on the associated color space, the intended picture quality will not be obtained. Accordingly, in preferred practice picture quality adjustment parameter value sets will be prepared according to the color space associated with the image data targeted for processing. In this Embodiment, picture quality adjustment parameter value sets are prepared for a standard color space (hereinafter referred to as the sRGB color space) and for a specific color space (hereinafter referred to as the eRGB color space). By so doing, since it is possible to use a different picture quality adjustment parameter value set depending on the color space, it is possible to execute picture quality adjustment appropriate for a particular color space. Typically, the color space associated with image data is the color space used when the image data was generated. Where JPEG compressed data is used, image data derived by executing a color space conversion process (from the YCbCr color space to the RGB color space) on the basis of the standard matrix mentioned earlier can be used as image data represented by the associated color space.

Typically, it is preferable to prepare a plurality of picture quality adjustment parameter value sets for different color spaces associated with image data.

FIG. 3(b) illustrates a portion of parameter file 400, for the sRGB color space in FIG. 3(a).

In the example shown in FIG. 3(b), levels of various picture quality adjustment processes and a memory color targeted for the memory color adjustment process are established as picture quality adjustment parameter values. Level of picture quality adjustment processing is represented in terms of five levels 1-5 (LV1-LV5).

Figure 4:
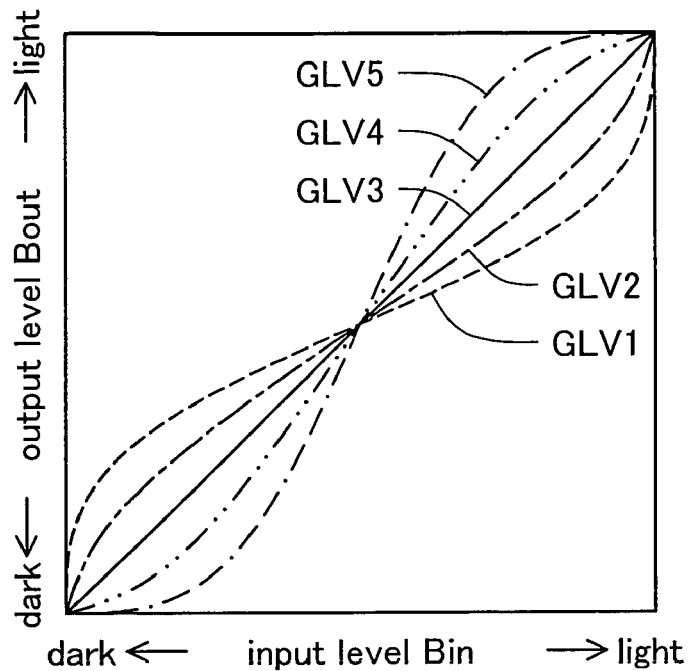
FIG. 4 illustrates the relationship between adjustment level and lightness value in a contrast adjustment process.

FIG. 4 illustrates the relationship between adjustment level and lightness value in a contrast adjustment process. In FIG. 4 there are shown five graphs GLV1-GLV5 that plot correspondence relationships between lightness input level Bin and output level Bout. In the contrast adjustment process, the lightness value at each pixel position represented by the image data is adjusted according to the graphs shown in FIG. 4. Where image data is represented by a color space that does not include lightness as a parameter (for example, an RGB color space), it is possible to derive the lightness value at each pixel position by means of converting it to a color space that includes lightness as a parameter (for example, the YCbCr color space or HSI color space).

Graph GLV3 in FIG. 4 is the graph used at LV3, which is the standard adjustment level (hereinafter referred to as the standard level). This graph GLV3 is established such that output level Bout is the same as input level Bin.

Graph GLV4 is the graph used at LV4, which is an adjustment level higher than standard adjustment level LV3. This graph GLV4 is established such that over a range of relatively small values of input level Bin, output level Bout is even smaller, whereas over a range of relatively large values of input level Bin, output level Bout is even larger. By executing the lightness value adjustment process using such a graph GLV4, it is possible to make relatively bright image brighter and relatively dark image areas darker, so as to be able to output an image having stronger contrast.

Graph GLV5 is the graph used at LV5, which is higher than adjustment level GLV4. This graph GLV5 is established such that change in output level Bout is even greater than the change in output level Bout occurring with graph GLV4. Using graph GLV5, it is possible to produce greater contrast in an output image than with graph GLV4.

Graph GLV2, on the other hand, is the graph used at LV2, which is an adjustment level lower than standard adjustment level LV3. In contrast to graphs GLV4 and GLV5, this graph GLV2 is established such that over a range of relatively small values of input level Bin, output level Bout is large, whereas over a range of relatively large values of input level Bin, output level Bout is small. By executing the lightness value adjustment process using such a graph GLV2, it is possible to lower brightness in relatively bright image and intensify brightness in relatively dark image areas, so as to be able to output an image having reduced contrast. Graph GLV1 is the graph used at LV1, which is lower than adjustment level GLV2, and is established such that change in output level Bout is even greater than the change in output level Bout occurring with graph GLV2. Using graph GLV1, it is possible to produce even lower contrast in an output image than with graph GLV2.

For other picture quality adjustment processes as well, the process is carried out analogously, with reference to a particular picture quality adjustment parameter. For example, in the brightness adjustment process, image data is adjusted so that a brighter image is output the higher the adjustment level; and in the sharpness adjustment process, image data is adjusted so that a sharper image is output the higher the adjustment level. In the memory color adjustment process, color of pixels whose color is close to a memory color pre-designated by a picture quality adjustment parameter value is adjusted to bring it into approximation with a predetermined target color.

The actual intensity of each adjustment process can be adjusted according to adjustment level and picture quality adjustment parameter values derived by analysis of image data. For example, in the contrast adjustment process, actual intensity may be adjusted with reference to the result of a comparison of the lightness distribution spread with a predetermined standard value. In preferred practice, in the event that spread determined from analysis of the image data is greater than the standard value, the adjustment level actually used will be modified to a lesser extend the greater this difference is; whereas on the other hand in the event that spread determined from analysis of the image data is less than the standard value, the adjustment level actually used will be modified to a greater the greater this difference is. By so doing, it is possible to avoid adjusting image contrast to an excessive level. As the parameter value for spread, it would be possible to use the dispersion or variance of the lightness distribution, for example.

In general, where intensity of adjustment processes is adjusted depending on adjustment level and picture quality adjustment parameter values derived by analysis of image data, it is possible to avoid executing adjustment processes to excessive levels.

In this Embodiment, a process appropriate to particular print medium or picture quality adjustment mode is executed as shown in FIG. 3(b). For example, where portrait mode has been selected as the picture quality adjustment mode, for a same given print medium, brightness is set to a moderately high level, contrast to a moderately low level, and sharpness to a moderately low level, as compared to the case where standard mode has been selected. Also, since skin tone is pre-selected as the memory color for the portrait mode, a skin tone color correction process is executed. By executing such a picture quality adjustment process, a soft image appearance is created, and skin tone of the human subject is adjusted to preferred skin tone.

Where plain paper has been selected as the print medium, for a same given picture quality adjustment mode, contrast to a moderately high level and sharpness to a moderately high level, as compared to the case where glossy paper has been selected. Where plain paper is used, contrast tends to be weaker and output images more susceptible to blurring than is the case when glossy paper is used. By executing such a picture quality adjustment process, it is possible to output a sharp image with greater contrast, as compared to the case where no picture quality adjustment process is executed.

Picture quality adjustment parameter value settings need not necessarily follow the settings in FIG. 3(b), it being possible to use other settings. In the example of FIG. 3(b), there are shown picture quality adjustment parameter values for the sRGB color space; picture quality adjustment parameter values for other color spaces can be set analogously. In this Embodiment, the print media type corresponds to the "output mode" in the invention, and picture quality adjustment mode corresponds to the "processing characteristic information."

In preferred practice, picture quality adjustment parameter values referent to type of print medium will be set so as to give the intended picture quality regardless of the type of print medium. In particular, it is preferable to set them so as to give a high level of approximation in appearance of images output on different types of print media, in other words, so as to minimize any difference in impression to an observer of the images. An observer of an image receives from the image impressions as to brightness, contrast, vividness, sharpness, and other such characteristics. Where such impressions (image appearance) are in close approximation regardless of the type of print medium, it becomes easy to output images that impart similar impressions, even where a number of different types of print media are used. In the example given in FIG. 3(b), where plain paper has been selected, for a given picture quality adjustment mode and color space, contrast and sharpness adjustment levels are set to higher levels than a case where glossy paper has been selected. Accordingly, differences in image contrast and sharpness occurring where plain paper is used and glossy paper is used can be minimized, thereby reducing the sense of incongruity (difference in impression) experience by an observer due to differences in the type of print medium.

Figure 5A:
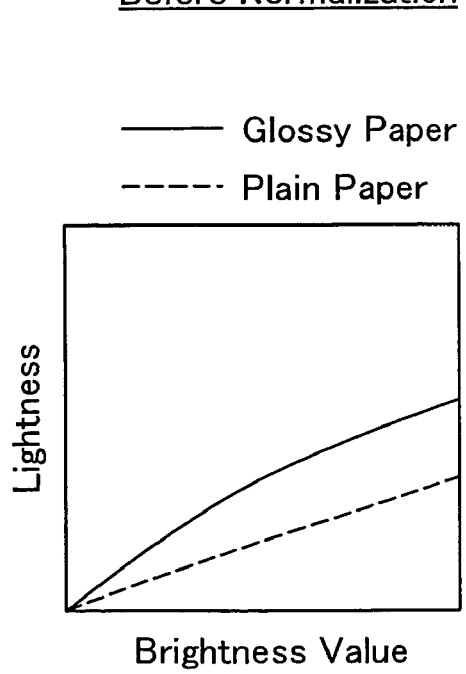
FIGS. 5(a) and 5(b) illustrate exemplary tone curves.
Figure 5B:
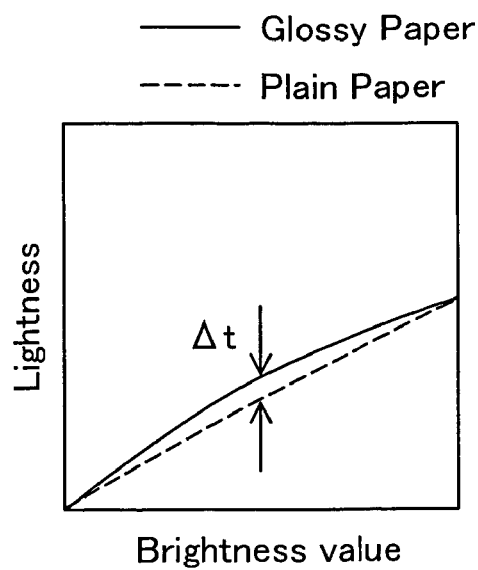

FIGS. 5(a) and 5(b) are exemplary tone curves showing correspondence relationships between lightness value indicated by image data and lightness (brightness) of an output image. The method for evaluating appearance of an output image due to type of print medium may employ a method of comparing tone curves, for example. Tone curves can be derived by actually outputting a number of achromatic color patches (color samples) of differing lightness, and performing colorimetric measurements on the output images.

FIG. 5(a) is a graph showing exemplary tone curves for glossy paper and plain paper respectively. Since glossy paper tends to have more intense gloss than plain paper, it is possible to reproduce higher brightness. In preferred practice, the shapes of the glossy paper tone curve and plain paper tone curve will be similar to one another. Human perception, upon detecting variation in brightness in an image, tends to appreciate variation in brightness throughout the entire image while being adapted to the maximum value of brightness in the image (hereinafter termed maximum brightness). Where maximum brightness is relatively low, human perception perceives variation in brightness to be relatively large. Conversely, where maximum brightness is relatively high, human perception will perceive this same variation in brightness to be relatively small. As a result, even where maximum values of reproduced brightness are different, if the shapes of the tone curves are similar, human perception will perceive the variations in brightness as being similar.

FIG. 5(b) is an illustration of the degree of approximation in shape of tone curves. Tone curves for glossy paper and plain paper, respectively, are shown in FIG. 5(b). These tone curves have been normalized with the respective maximum values of brightness of the tone curves shown in FIG. 5(a).

In FIG. 5(b) is shown the difference $\Delta t$ between the two tone curves for a given lightness value (hereinafter referred to as normalized brightness difference). While the magnitude of normalized brightness difference $\Delta t$ varies depending on lightness value, in general it is smaller the more similar in shape the two tone curves are. Accordingly, the degree of approximation of the two tone curves can be evaluated on the basis of the magnitude of normalized brightness difference $\Delta t$. As an index of the degree of approximation of the two tone curves, it would be possible to use, for example, the maximum absolute value of the difference $\Delta t$, or the average value of the difference $\Delta t$ over the entire range. Thus, it can be stated that a smaller degree of approximation index signifies less difference in shape of the two tone curves, i.e., greater similarity in shape of the two tone curves.

In preferred practice, picture quality adjustment parameter value sets will be established such that execution of the picture quality adjustment process reduces the difference in shape of tone curves due to different types of print media. By so doing, differences in appearance of images due to different types of print media can be held to a minimum, that is, the degree of similarity in image appearance can be increased.

Evaluation of difference in output image appearance with different types of print media is not limited to the use of the tone curves, and may be based instead on sensory evaluation by comparing printed images using different print media. In this process, it will be preferable to establish picture quality adjustment parameter values such that differences in appearance of output images derived by executing picture quality adjustment processes according to type of print medium are smaller than differences in appearance of output images derived by executing a given picture quality adjustment process irrespective of the type of print medium.

Figure 6:
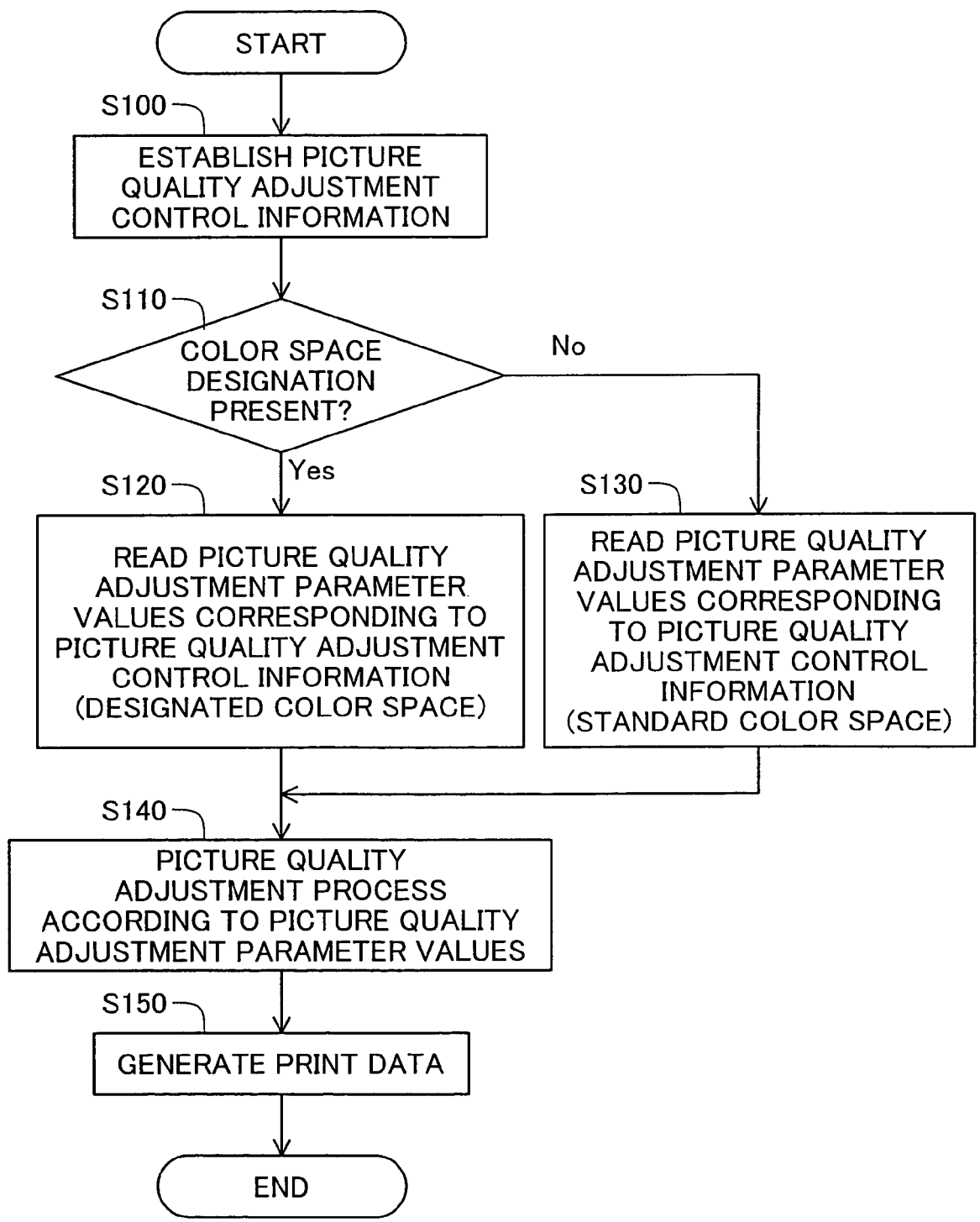
FIG. 6 is a flowchart of an image processing routine.

B3. Image Processing:

FIG. 6 is a flowchart of an image processing routine executed by printer driver 200 once receiving image data from image processing application 600 (FIG. 2). In Step S100, the picture quality adjustment control information setting module 210 executes a process for setting picture quality adjustment control information.

FIG. 7 is an illustration of an exemplary screen for setting picture quality adjustment control information, displayed on monitor 21 (FIG. 1) by picture quality adjustment control information setting module 210 (FIG. 2). On the screen shown in FIG. 7 are displayed the types of print media utilizable for printing by printer 20, and picture quality adjustment modes. From the types of print media displayed on the settings screen in FIG. 7, the user can select the printer paper that will actually be used. Also, from the picture quality adjustment mode displayed on the settings screen, the user can select a picture quality adjustment mode appropriate for the image being output.

Certain kinds of image generating devices generate image data files that contain both image data and various kinds of information related to the image data (hereinafter termed image data-related information). For example, some digital cameras permit switching among operating modes during shooting (hereinafter termed shooting mode) depending on the shooting scene, such as a portrait scene or landscape scene, and store this information relating to shooting mode used in shooting (hereinafter termed shooting mode information) in the image data file together with the image data per se. Such file formats include, for example, the Exif file format.

In preferred practice, image processing application 600 will send image data-related information together with image data, to the printer driver 200. By so doing, picture quality adjustment control information setting module 210 is able to analyze the image data-related information and automatically select a picture quality adjustment mode according to the shooting mode information. Also, picture quality adjustment mode according to shooting mode information can be used as an initial setting, and the picture quality adjustment mode thus selected may be shown on the settings screen (FIG. 7) so that the user can select another mode. If the image data-related information does not include shooting mode information or if the image data-related information is not available for the image data, the setting screen may be displayed in which picture quality adjustment mode is unselected, prompting the user to make a selection.

Depending on the printer, there may be provided a mechanism for automatically identifying the type of print medium that has been loaded for printing. In this case, an arrangement whereby the printer sends to computer 90 information relating to this identification (hereinafter termed identified medium information), whereupon the picture quality adjustment control information setting module 210 automatically selects the type of print medium based on the identified medium information it receives would be acceptable.

Next, in Step S100 (FIG. 6), picture quality adjustment control information setting module 210 (FIG. 2) makes a determination as to whether a color space associated with the image data has been designated. Certain image generating devices create image data on the assumption that it will be processed in a predetermined color space, and place in the image data file information designating this predetermined color space (hereinafter termed designated color space information). Where picture quality adjustment control information setting module 210 is able to utilize such image data-related information, it will analyze the image data-related information and determine whether designated color space information is present.

In the event that designated color space information is found (Step S110: Yes), the picture quality adjustment control information setting module 210 sets the designated color space as the color space information of the picture quality adjustment control information. Next, in Step S120, the parameter value acquisition module 220 reads in from the parameter file 400 a picture quality adjustment parameter value set corresponding to the picture quality adjustment control information (type of print medium, picture quality adjustment mode, and designated color space).

In the event that designated color space information is not found (Step S110: No), the picture quality adjustment control information setting module 210 sets a standard color space as the color space information of the picture quality adjustment control information. Next, in Step S130, the parameter value acquisition module reads in from the parameter file 400 a picture quality adjustment parameter value set corresponding to picture quality adjustment control information (type of print medium, picture quality adjustment mode, and standard color space).

In the event that picture quality adjustment control information setting module 210 is not able to utilize image data-related information, picture quality adjustment control information setting module 210 decides that no designated color space information is present.

Color space selection by the user via the settings screen shown in FIG. 7 may be permitted as well.

Next, in Step S140, the picture quality adjustment module 230 executes a picture quality adjustment process according to the picture quality adjustment parameter value set read in by the parameter value acquisition module 220. In preferred practice, the color space targeted for the picture quality adjustment process (hereinafter termed the adjustment color space) will be established in advance, and the picture quality adjustment process will be executed after having first executed on the image data a color space conversion process to convert it from the color space associated with the image data to the adjustment color space. By so doing, variation in color of the output image relative to variation in the intensity of picture quality adjustment can be standardized regardless of associated color space, so that when adjusting picture quality adjustment parameter values with reference to picture quality adjustment control information, an operator can refer to adjustment results for one color space while adjusting picture quality adjustment parameter values for the other color space. Thus, the effort required in adjusting picture quality adjustment parameter values can be reduced.

In Step S150, the print data generating module 240, on the basis of the quality-adjusted image data, generates print data utilizable by the printer 20. In this Embodiment, print data generating module 240 executes a process to convert RGB data for each pixel to multiple-tone data of ink amounts, utilizable by the printer 20, and performs a halftone process on the multiple-tone data to generate print data. The process for conversion to multiple-tone data ink amounts is one kind of color space conversion process, and is typically executed on the basis of a lookup table that represents corresponding relationships among input values and output values. In preferred practice, corresponding relationships among input values and output values will be established with reference to type of print medium.

Print data generated by the print data generating module 240 is sent to the printer 20, whereupon the printer 20 performs printing on the basis of the received print data.

In the above manner, in Embodiment 1, the picture quality adjustment process is executed on the basis of picture quality adjustment parameter values that have been established according to type of print medium, color space associated with the image data, and picture quality adjustment mode. Accordingly, a user will be able to appropriately adjust picture quality of an image regardless of the type of print medium or color space associated with the image data.

In Embodiment 1, printer driver 200 is able to execute the picture quality adjustment process according to picture quality adjustment parameter values. As a result, a user will be able to easily obtain an output image of picture quality adjusted according to the type of print medium, etc., regardless of the functions of the image processing application 600.

C. EMBODIMENT 2

There are two points of difference between Embodiment 2 and Embodiment 1 described above. The first is that the printer 20 is able to execute printing using a plurality of ink sets of mutually different combinations of utilizable inks. The second is that the picture quality adjustment parameter value set is prepared with reference to ink set, in addition to type of print medium, color space, and picture quality adjustment mode. The arrangement of the computer 90 (FIG. 2) is the same as in Embodiment 1.

In Embodiment 2, printer 20 can utilize either a four-color ink set or an eight-color ink set, by replacing ink cartridges (not shown). The four-color ink set is composed of cyan ink C, magenta ink M, yellow ink Y, and black ink K. The eight-color ink set is composed of the four colors CMYK, plus light cyan ink LC having substantially the same hue as cyan ink C but lighter in density, light magenta ink LM having substantially the same hue as magenta ink M but lighter in density, dark yellow ink DY having substantially the same hue as yellow ink Y but darker in density, and light black ink LK which like black K is achromatic, but lighter in density.

Where the eight-color ink set is employed, by using inks of different densities, it is possible to more smoothly represent fine gradations in tone. Employing the four-color ink set on the other hand, since a greater number of nozzles can eject a given ink, printing can be carried out faster. As compared to when the eight-color ink set is employed, however, it is possible that tone representation will not be as smooth. Thus, where a picture quality adjustment process is executed using the four-color ink set or the eight-color ink set exclusively, it is possible in some instances that the intended picture quality will not be achieved, depending on the ink set. Accordingly, in this Embodiment, the picture quality adjustment parameter value set is prepared according to ink set (not shown). By so doing, it becomes possible to use different picture quality adjustment parameter value sets depending on the ink set, so that a picture quality adjustment process appropriate for a particular ink set can be executed.

Ink sets utilizable by the printer 20 are not limited to the four-color ink set and the eight-color ink set mentioned above, and may be established in any manner according to desired printed image quality and the like. For example, it would be possible to use an ink set including inks of various hues such as red ink or violet ink, an ink set containing pigment inks, an ink set containing dye inks, or the like. In any event, as long as ink sets differ there exists the possibility that ink coloration and color reproduction in printed images will differ. Accordingly, in preferred practice, picture quality adjustment parameter value sets will be prepared according to ink set, and employed selectively.

Printer driver 200, having received image data from the image processing application 600 (FIG. 2) executes the image processing shown in FIG. 6. FIG. 8 is an illustration of an exemplary screen for setting picture quality adjustment control information, displayed on monitor 21 (FIG. 1) by picture quality adjustment control information setting module 210 (FIG. 2). The setting screen in this Embodiment differs from the setting screen in Embodiment 1 (FIG. 7) in that ink sets utilizable by the printer 20 for printing are displayed in addition to print medium type and picture quality adjustment mode. From the ink sets shown on the setting screen, the user is able to select the ink set that will actually be used. Depending on the printer 20, there may be provided a mechanism for automatically identifying the ink set from an installed ink cartridge. In this case, an arrangement whereby printer 20 sends information regarding the identification result (hereinafter termed identified ink information) to the computer 90, and picture quality adjustment control information setting module 210 automatically selects an ink set of the basis of the received identified ink information, would be acceptable.

The picture quality adjustment control information setting module 210 executes the processes of Steps S100 and S110 in order to create picture quality adjustment control information composed of print medium type, picture quality adjustment mode, color space, and ink set.

In Steps S120 and S130, the parameter value acquisition module 220 reads in from the parameter file 400 a picture quality adjustment parameter value set corresponding to the picture quality adjustment control information. In Step S140, the picture quality adjustment module 230 executes a picture quality adjustment process according to the picture quality adjustment parameter value set read in by the parameter value acquisition module 220. In Step S150, the print data generating module 240, on the basis of the quality-adjusted image data, generates print data utilizable by the printer 20. The print data so generated is sent to the printer 20.

In the above manner, in Embodiment 2, a picture quality adjustment process is executed on the basis of picture quality adjustment parameter values that have been established according to ink set. Accordingly, a user will be able to appropriately adjust picture quality of an image, regardless of the type of ink set.

In preferred practice, picture quality adjustment parameter values according to an ink set will be established so as to minimize the difference in appearance of images output with different ink sets. By so doing, the user can readily obtain images that give similar impressions, even where multiple ink sets are employed.

D. EMBODIMENT 3

Figure 9:
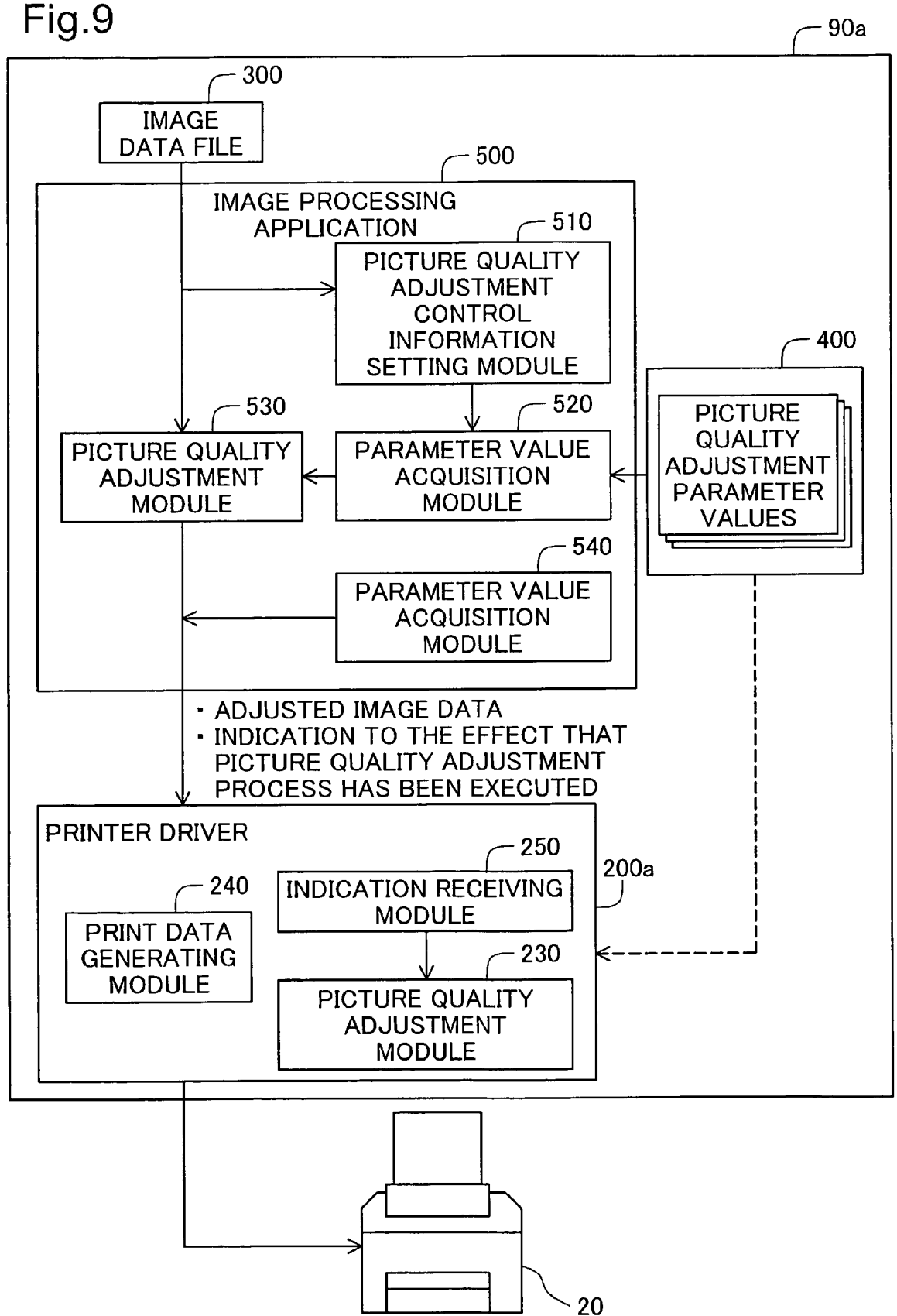

FIG. 9 is a block diagram of the arrangement of a computer 90a in Embodiment 3. A difference from the Embodiment depicted in FIG. 2 is that there is provided an image processing application 500 able to execute picture quality adjustment processes according to picture quality adjustment parameter values.

In this Embodiment, computer 90a comprises an image processing application 500, a printer driver 200a, and a parameter file 400. The image processing application 500 differs from the image processing application 200 shown in FIG. 2, in that it comprises a picture quality adjustment control information setting module 510, a parameter value acquisition module 520, a picture quality adjustment module 530, and an indication transmitting module 540.

The picture quality adjustment control information setting module 510 functions analogously with module 210 shown in FIG. 2, the parameter value acquisition module 520 functions analogously with module 220, and the picture quality adjustment module 530 functions analogously with module 230.

In addition to functional modules analogous to those of printer driver 200 shown in FIG. 2, printer driver 200a also has an indication receiving module 250 (elements other than the picture quality adjustment module 230, print data generating module 240, and indication receiving module 250 are not shown).

In the event of a print command issued by the user to the image processing application 500, the image processing application 500 and printer driver 200a execute a process analogous to the image process depicted in FIG. 6. The picture quality adjustment control information setting module 510 executes a process to establish picture quality adjustment control information. The parameter value acquisition module 520 reads in from the parameter file 400 a picture quality adjustment parameter value set corresponding to picture quality adjustment control information established by the picture quality adjustment control information setting module 510. The picture quality adjustment module 530 then executes a picture quality adjustment process according to the picture quality adjustment parameter value set read in by the parameter value acquisition module 520.

Image data for which adjustment of picture quality has been completed is sent to the printer driver 200a. An "indication to the effect that picture quality adjustment process has been executed" is also sent to the printer driver 200a, by indication transmitting module 540. In the event that the indication receiving module 250 of printer driver 200a receives an "indication to the effect that picture quality adjustment process has been executed," execution of the picture quality adjustment process by picture quality adjustment module 230 is halted. The print data generating module 240 then generates print data on the basis of the adjusted image data as-received.

The print data so generated is sent to the printer 20, whereupon the printer 20 performs printing according to the received print data.

In the event that a picture quality adjustment process according to a picture quality adjustment parameter value set is not executed by image processing application 500, indication transmitting module 540 does not send an "indication to the effect that picture quality adjustment process has been executed." In the event that the indication receiving module 250 does not receive an "indication to the effect that picture quality adjustment process has been executed," picture quality adjustment module 230 will preferable execute an picture quality adjustment process. At this time, the parameter file 400 is used in common by the image processing application 500 and the printer driver 200a.

In the above manner, in this Embodiment, the image processing application 500 executes a picture quality adjustment process according to picture quality adjustment parameter values, whereby picture quality can be adjusted appropriately according to the mode of printer 20. Additionally, since the parameter file 400 is used in common by the image processing application 500 and the printer driver 200a, large differences in picture quality of output images between picture quality adjustment processes executed by the image processing application 500 and picture quality adjustment processes executed by the printer driver 200a can be avoided. Further, in this Embodiment, a series of processes for outputting an image are executed in combination by the image processing application 500 and the printer driver 200a. Here, picture quality can be adjusted appropriately, regardless of which program executes the picture quality adjustment process. As a result, when outputting an image, there can be output an image of appropriately adjusted picture quality, without the user having to bother with selection of a program for executing the picture quality adjustment process.

Where a picture quality adjustment process is executed by the image processing application 500, a picture quality adjustment process according to an indication by indication transmitting module 540 is not executed by printer driver 200a, so that execution of a reduplicative picture quality adjustment process can be prevented, even in the absence of an instruction by the user to the printer driver 200a. Further, since the image processing application 500 is furnished with a picture quality adjustment module 530, quality-adjusted images can be output even when a printer driver with no picture quality adjustment module is used.

Further, in this Embodiment, image processing application 500 corresponds to the "first image processing module" of the invention, and printer driver 200*a* corresponds to the "second image processing module."

E. EMBODIMENT 4

Figure 10:
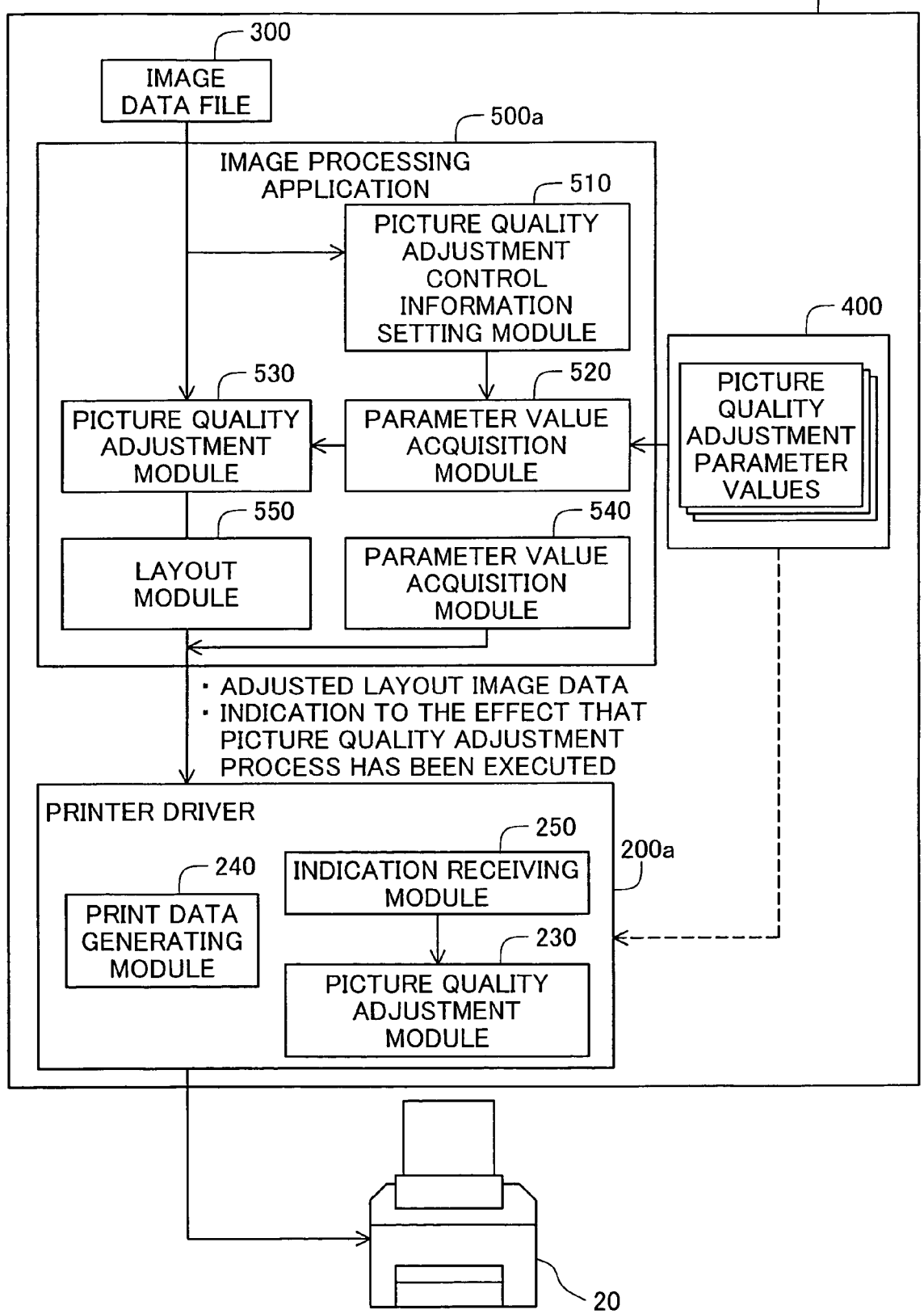
FIG. 10 is a block diagram of the arrangement of a computer 90b.

FIG. 10 is a block diagram of the arrangement of a computer 90*b* in Embodiment 4. A difference from the Embodiment depicted in FIG. 9 is that image processing application 500*a* comprises a layout module 550. In the event of printing using a plurality of sets of image data, the layout module 550 is able to execute a layout process to lay out on a single page a plurality of images represented respectively by the several sets of image data.

Figure 11:
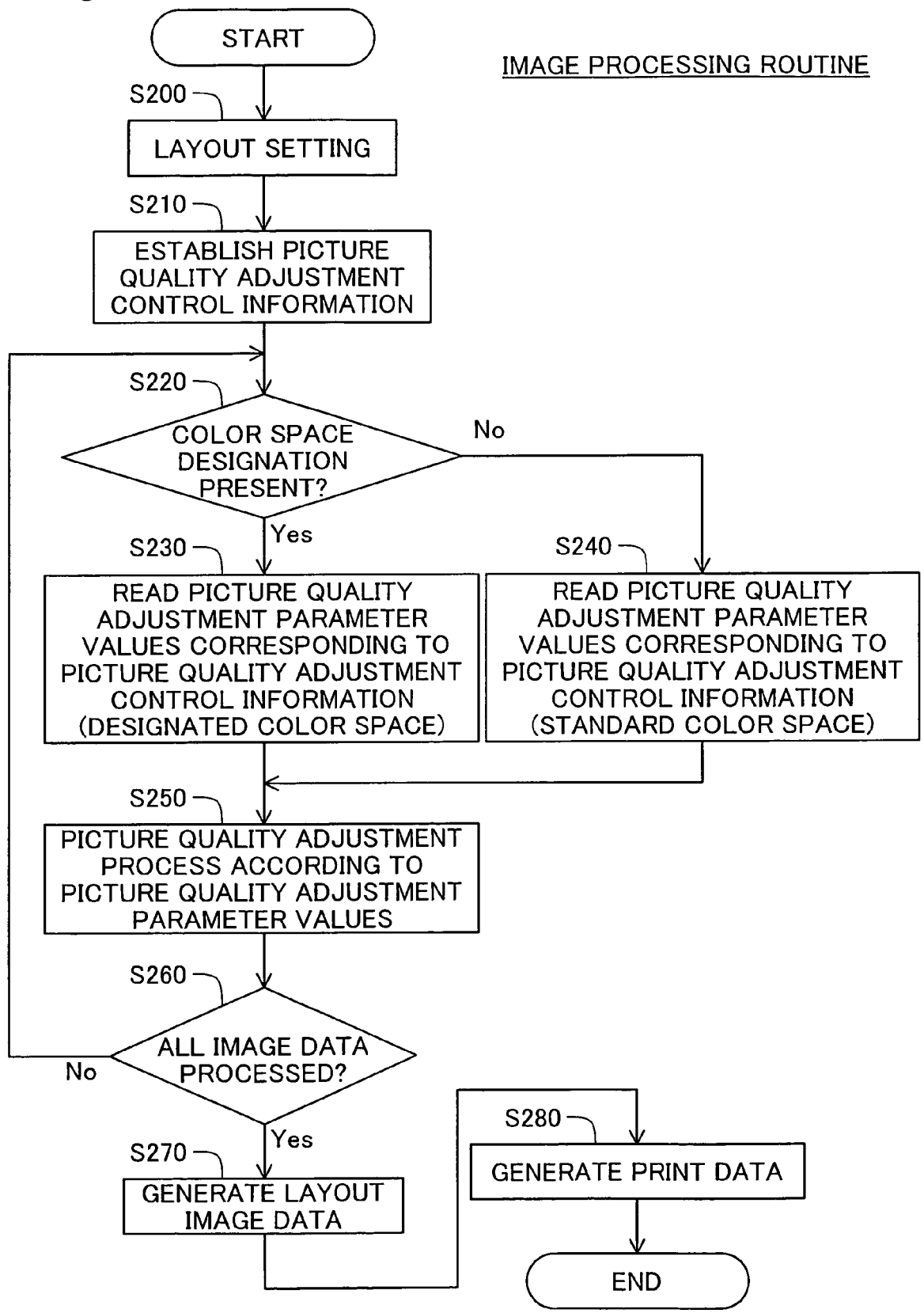
FIG. 11 is a flowchart showing an image processing routine.

FIG. 11 is a flowchart showing an image processing routine executed by computer 90*b*. In Step S100, the layout module 550 of image processing application 500*a* executes a layout setting process.

Figure 12:
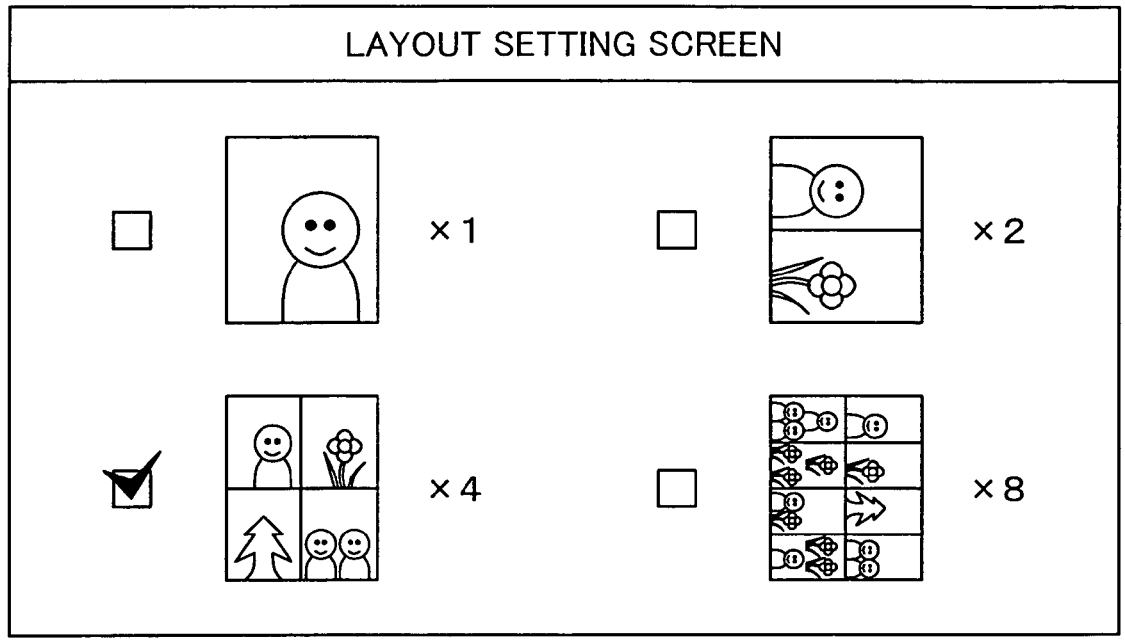
FIG. 12 illustrates an exemplary layout setting screen.

FIG. 12 is an illustration of an exemplary layout setting screen displayed by layout module 550 on monitor 21 (FIG. 1). In the screen shown in FIG. 12, a plurality of numbers, each indicating a number of image assigned to one page (hereinafter termed layout numbers) are displayed. The user may select a desired number from among these layout numbers. The number of images targeted for printing are laid out on a page according to layout number. The layout setting is not limited to layout number, and may instead consist of any arrangement that is settable by the user. The image placement setting may be made user-modifiable as well.

In Step S210 (FIG. 11), the picture quality adjustment control information setting module 510 executes a process to set picture quality adjustment control information.

Figure 13:
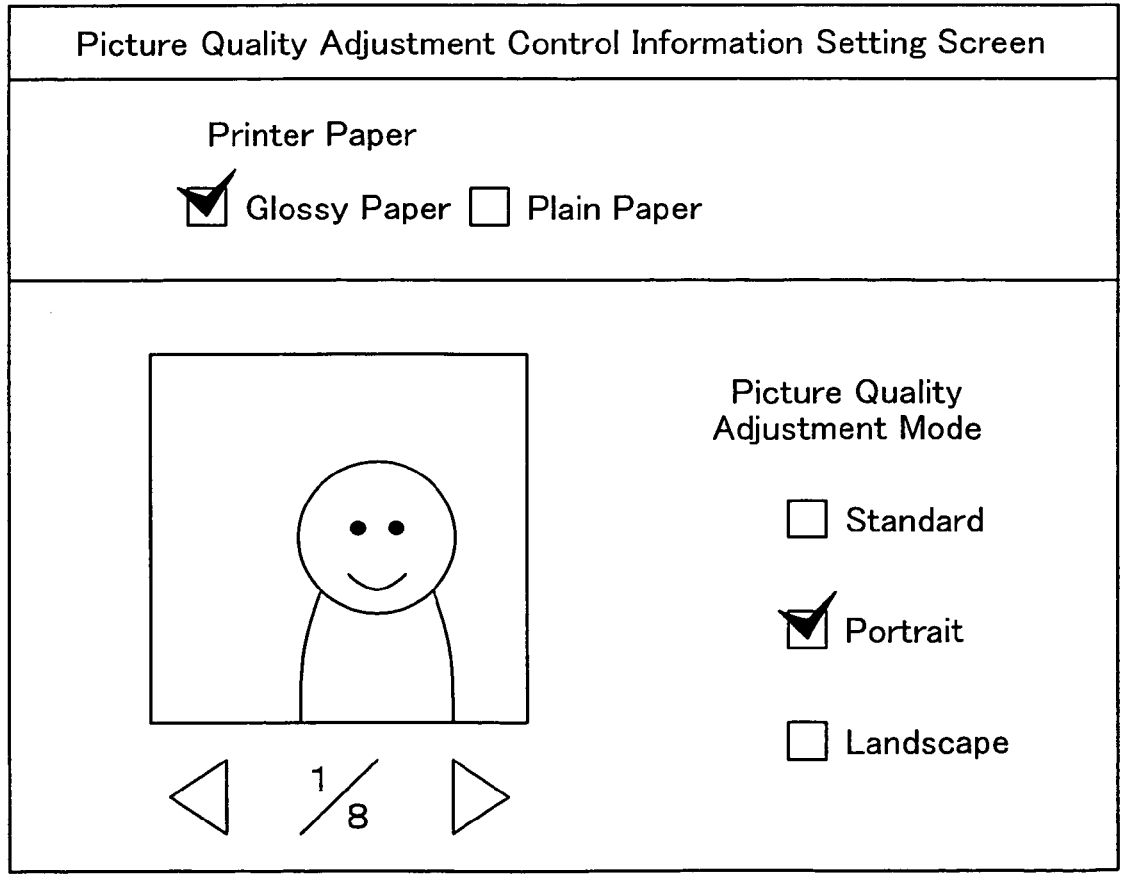
FIG. 13 illustrates an exemplary picture quality adjustment control information setting screen.

FIG. 13 is an illustration of an exemplary picture quality adjustment control information setting screen displayed on monitor 21 (FIG. 1). A point of difference from the settings screen shown in FIG. 7 is that picture quality adjustment mode can be set for each individual set of image data targeted for printing. At the top of the setting screen, types of print media are shown. The type of print medium is used in common for a plurality of sets of image data. In the lower portion of the setting screen are shown a preview image and picture quality adjustment modes for a single set of image data among the plurality of sets targeted for printing. The user, by switching among sets of image data while verifying preview images, can set a picture quality adjustment mode for each set of image data targeted for printing.

Processes executed in Steps S220, S230, S240 and S250 (FIG. 11) are analogous to the processes in Steps S110, S120, S130 and S140 of FIG. 6. Picture quality adjustment control information setting module 510 sets picture quality adjustment control information according to each set of image data. Parameter value acquisition module 520 reads in a picture quality adjustment parameter value set according to each set of image data. Picture quality adjustment module 530 executes a picture quality adjustment process according to each set of image data. In Step S260, layout module 550 makes a determination as to whether picture quality adjustment processes for all image data have been completed. If not yet performed for all sets of image data (Step S260: No), the processes of Step S220 -S250 are executed for image data that has not yet been subjected to the picture quality adjustment process.

In Step S270 layout module 500, using image data that has been subjected to the picture quality adjustment process, generates layout image data according to the layout setting established in Step S200. Layout image data consists of a number of sets of image data laid out according to the layout setting.

The layout data so generated is sent to printer driver 200*a*. The print data generating module 240 of printer driver 200*a* generates print data on the basis of the received layout image data.

The generated print data is sent to printer 20, whereupon printer 20 performs printing according to the received print data.

The processes of Step S220-280 are repeated for each page to be output. By so doing, even in cases where the number of sets of image data targeted for printing is rather large, since these can be processed and printed in batches, the increase in the capacity required of the RAM 93 (FIG. 1) and HDD 94 required for used by the image processing application 500*a* can be held to a minimum.

In this way, in this Embodiment, since when laying out a plurality of sets of image data on a given page for output, a picture quality adjustment process appropriate for each individual set of image data can be executed, each of the plurality of laid out images can be adjusted to desirable image quality.

F. EMBODIMENT 5

Figure 14:
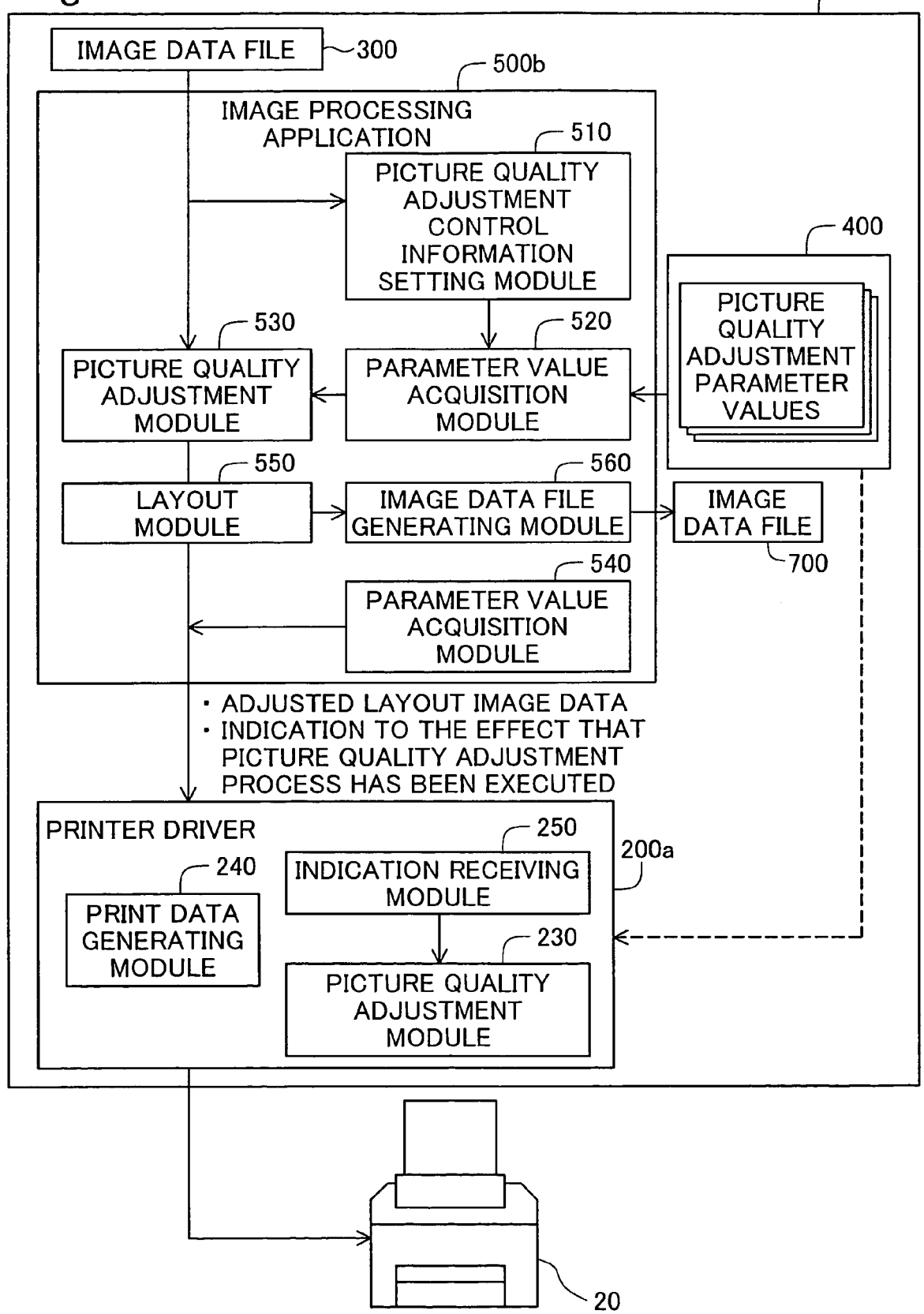
FIG. 14 is a block diagram of the arrangement of a computer 90c.

FIG. 14 is a block diagram of the arrangement of a computer 90*c* in Embodiment 5. A difference from the Embodiment shown in FIG. 10 is that the image processing application 500*b* comprises an image data file generating module 560. The image data file generating module 560 has the function of storing adjusted image data obtained by executing the picture quality adjustment process.

In this Embodiment, image data file generating module 560 is able to store in a reusable manner layout image data which has been generated by layout module 550. More specifically, image data file generating module 560 records onto HDD 94 (FIG. 1) an image data file 700 that contains the layout data. In order to output an image, the image processing application 500*b* is able to again read the picture quality-adjusted image data file 700 from HDD 94. At this time, since a picture quality-adjusted image can be output without having to again execute the picture quality adjustment process, the time required to output the image can be reduced.

Here, in preferred practice, when generating the picture quality-adjusted image data file 700 "information to the effect that adjustment has been performed" will be stored in the image data file 700 as image data-related information. By employing the arrangement whereby the picture quality adjustment module 530 does not execute the picture quality adjustment process when image data-related information includes "information to the effect that adjustment has been performed," execution of a reduplicative picture quality adjustment process can be prevented, even in the absence of an instruction by the user to the image processing application 500*b*. An arrangement whereby where when image data-related information includes "information to the effect that adjustment has been performed," the indication transmitting module 540 sends an "indication to the effect that picture quality adjustment process has been executed" to the printer driver 200*a* is possible as well. By so doing, a reduplicative picture quality adjustment process can be prevented, even in the absence of an instruction by the user to the printer driver 200*a*. The image data file 700 in this Embodiment corresponds to the "image data set" in the invention, and the image data file generating module 560 corresponds to the "image data set generating module" in the invention.

In the above manner, in this Embodiment, it is possible to generate and to subsequently reuse a picture quality-adjusted image data file 700. As a result, the number of times that the picture quality process needs to be executed can be reduced, and images having the same given picture quality can be output.

G. VARIATIONS

The invention is not limited to the Embodiments or embodiments set forth hereinabove, but may be reduced to practice in various modes without departing from the scope and spirit thereof. The following variations are possible, for example.

G1. Variation 1

Processing characteristic information relating to characteristics of the picture quality adjustment process is not limited to the picture quality adjustment mode described earlier; various other kinds of information may be used. For example, arrangements whereby information relating to characteristics of a contrast adjustment processes, brightness adjustment process, or other adjustment process is established as processing characteristic information are also acceptable. An arrangement whereby, as regards contrast, selection can be made from the settings, "high", "medium high", "standard", "medium low" and "low" would be possible. Here, in preferred practice, picture quality adjustment parameter values (adjustment levels) will be prepared according to image output module modes, such as type of print medium and ink set, even where characteristic settings for each adjustment process are the same.

As the image generating device, there may be employed a device that stores preferred characteristics for each adjustment process as image data-related information in the image data file. Such a device could specify preferred characteristics for each adjustment process on the basis of operational settings at the time the image data is created. In preferred practice, when handling an image data file created by such an image generating device, settings specified by the image data-related information will be used as the characteristic settings for each adjustment process.

Alternatively, as the image generating device, there may be employed a device that stores, by way of image data-related information, the actual level of processing of each adjustment process, prepared on the assumption of a specific mode for the image output module. In preferred practice, when handling an image data file created by such an image generating device, settings, differences in actual level between the specific mode and other modes will be prepared by way of the picture quality adjustment parameter values. In this case, picture quality adjustment parameter values are prepared according to the mode of the image output module. When outputting an image, by correcting, on the basis of picture quality adjustment parameter values corresponding to the mode actually used, the level of each adjustment process specified by image data-related information, it is possible to execute picture quality adjustment processes appropriate for various modes.

G2. Variation 2

In the Embodiments hereinabove, the parameter file will preferably be recorded in a rewritable manner. By so doing, it becomes possible to carry out operation to update or supplement the parameter file. Also, in preferred practice, the parameter file will be recorded in a manner such that it is rewritable independently of the printer driver and image processing application. By so doing, it becomes possible to rewrite the parameter file without having to rewrite the program for executing the picture quality adjustment process, so that the parameter file can be updated or supplemented without the user needing to have detailed knowledge pertaining to rewriting the program.

G3. Variation 3

In the Embodiments hereinabove, the picture quality adjustment process is executed in a specific color space, that is, the picture quality adjustment process is executed independently from the color space conversion process. In the color space conversion process, it is important to maintain appropriate correspondence relationships among colors before and after the process. On the other hand, in the picture quality adjustment process, it is important to produce good picture quality by means of the process. Accordingly, by means of an arrangement whereby the picture quality adjustment process is executed independently from the color space conversion process, when an operator is adjusting picture quality adjustment parameter values according to picture quality adjustment control information, it will be possible to adjust reproduced picture quality while maintaining appropriate correspondence relationships among colors.

G4. Variation 4

In the Embodiments hereinabove, image data and image data-related information need not be stored in the same image data file. Generally, any arrangement wherein image data and image data-related information constitute a mutually associated image data set would be acceptable.

G5. Variation 5

In the event that a number of different image output device models are utilizable, picture quality adjustment parameter values may preferably be prepared according to the model. Where device models differ, it is possible that color reproduction of output images will differ as well. Accordingly, by preparing and selectively using picture quality adjustment parameter values according to different device models, it is possible to execute a picture quality adjustment process appropriate for a particular device model.

Here, in preferred practice, picture quality adjustment parameter values will be stored in independent parameter files utilizable on a model-by-model basis or device-by-device basis. By so doing, it is sufficient simply to place in memory parameter files for utilizable device models, and thus to avoid the need for large memory capacity to store the picture quality adjustment parameter values.

Also, in preferred practice, picture quality adjustment parameters according to device model will be established in such a way as to minimize difference in appearance of output images due to differences among output device models. By so doing, even where a user utilizes a number of different output device models, it is a simple matter to obtain images of similar impression.

G6. Variation 6

In the event that it is not possible to use picture quality adjustment parameter values corresponding to picture quality adjustment control information, a picture quality adjustment process according to standard picture quality adjustment parameter values may be executed instead. Preferably, such standard picture quality adjustment parameter values incorporated into the picture quality adjustment module in advance. Alternatively, standard picture quality adjustment parameter values may be stored in parameter file 400.

G7. Variation 7

In the Embodiments hereinabove, various kinds of information besides that described in the Embodiments could be used as picture quality adjustment control information. For example, picture quality adjustment parameter values could be established according to regional information indicating the region in which the image output device is used. Where regional information (e.g. country or city) differs, picture qualities that a user tends to feel are appropriate may differ as well. As a result, where the picture quality adjustment process is unvarying, it is possible that, depending on the region, picture quality considered appropriate by a user will not be obtained. By preparing picture quality adjustment parameter values according to different regions, it becomes possible to selectively use picture quality adjustment parameter values according to region, so that picture quality adjustment parameter values appropriate for particular regions can be carried out.

G8. Variation 8

Figure 15:
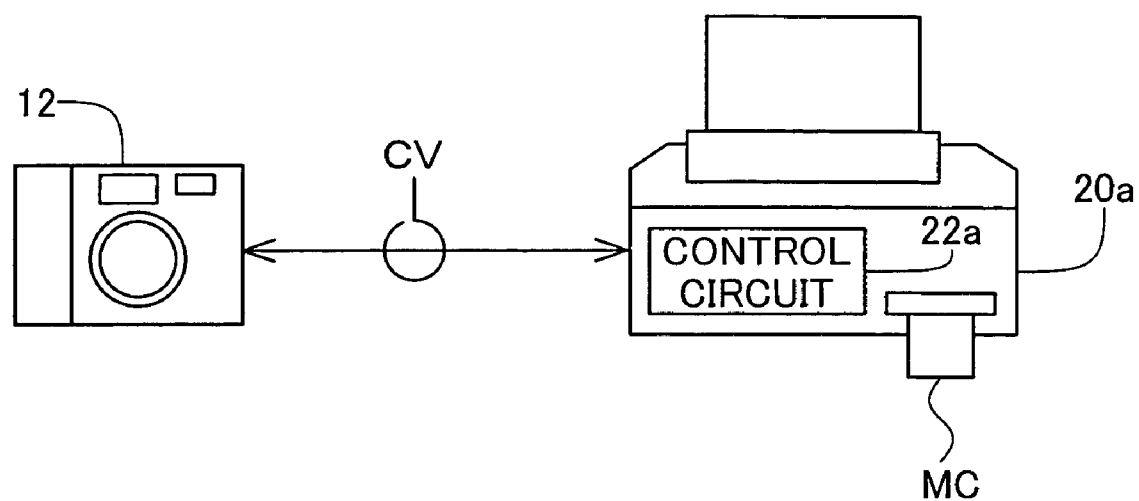

In the Embodiments hereinabove, the computer 90 (image processing device) and printer 20 (image output device) are provided independently; however, instead, an arrangement whereby the control circuit of the printer executes the picture quality adjustment process according to picture quality adjustment parameter values would also be acceptable. FIG. 15 illustrates an example of execution of a picture quality adjustment process by a control circuit 22*a* of a printer 20*a*. In the example shown in FIG. 15, control circuit 22*a*, like the computer 90 shown in FIG. 1, has a CPU, RAM and the like (not shown), and is able to execute the same functions as the printer driver 200 of FIG. 2. Control circuit 22*a* further comprises nonvolatile memory (not shown) able to hold data regardless of whether printer 20*a* power is on or off, the parameter file 400 is stored in this nonvolatile memory. Various kinds of memory such as EEPROM could be employed as the nonvolatile memory. Here, in preferred practice, the parameter file 400 will be rewritable.

In this example, printer 20*a* and digital camera 12 are connected via a cable CV. Printer 20*a* is able to receive image data from digital camera 12 through cable CV. Control circuit 22*a* of printer 20*a* executes on the received image data a picture quality adjustment process based on picture quality adjustment parameter values, and then performs printing of an image according to the quality-adjusted image data. By employing such an arrangement, it is possible to output a quality-adjusted image without the use of a computer. In this example, control circuit 22*a* of printer 20*a* functions as the image processing device. The method by which printer 20 receives data is not limited to one using a cable; a method whereby it receives image data directly from a digital camera or other image generating device via a wireless link, via a memory card MC, or any of various other methods could be used instead.

G9. Variation 9

There may be an arrangement whereby the printer driver and image processing application utilize in common at least one module selected from the picture quality adjustment control information setting module, parameter acquisition module, and picture quality adjustment module. By so doing, less capacity is required of the HDD 94 (FIG. 1) for storing the printer driver and image processing application.

G10. Variation 10

The image output unit is not limited to a printer, but could instead be reduced to practice in any of various other modes such as an LDC display for producing images on a liquid crystal panel; a CRT display for producing images on a Braun tube; or the like. In this case, by preparing and selectively using picture quality adjustment parameter values according to particular image output unit modes, it is possible to execute picture quality adjustment processes appropriate to a particular mode.

Also, in this case picture quality adjustment parameter values will preferably be established so as to minimize difference in appearance among output images, due to different modes. By so doing, it is easy for a user to obtain images of similar impression, even where a number of different modes are used.

G11. Variation 11

Some of the arrangements realized through software in the Embodiments could instead be realized through hardware, and conversely some of the arrangements realized through hardware could instead be realized through software. For example, some of the functions of printer driver 200 (FIG. 2) could be executed by a control circuit (not shown) in printer 20.

G12. Variation 12

The term "digital camera" herein includes both digital still cameras that take still images, as well as digital video cameras that record motion video.

The present application claims the priority based on Japanese Patent Application No. 2003-291322 filed on Aug. 11, 2003, which is herein incorporated by reference in its entirety.

What is claimed is:

1. A method of processing target image data representing a target image, for the purpose of printing the target image according to any of a plurality of output modes that are dependent at least upon a print medium to be used, the method comprising:
   (a) providing a parameter file that stores a plurality of parameter value sets in association with the plurality of output modes, respectively, each parameter value set including a plurality of picture quality adjustment parameters;
   (b) acquiring one parameter value set from the parameter file according to output mode information indicating one output mode to be used at the printing of the target image;
   (c) executing picture quality adjustment of the target image data, using the acquired parameter value set; and
   (d) generating print data by converting the quality-adjusted target image data into data of ink amounts according to a type of print medium corresponding to the output mode to be used at the printing,
   wherein the one parameter value set is acquired from the parameter file according to processing characteristic information established for the picture quality adjustment of the target image as well as the output mode information.

2. A method according to claim 1, wherein the processing characteristic information includes shooting mode information appended to the target image data when the target image data is created by a digital camera.

3. A method according to claim 1, wherein the output mode information includes information indicating a type of print medium and an ink set that are to be used during printing of the target image.

4. A method according to claim 1, wherein the output mode information includes information indicating a model of image printing unit used to print the target image.

5. A method according to claim 1, further comprising:
   allowing a user to set at least some of the information used to acquire the one parameter value set in the acquiring of the one parameter value set.

6. A method according to claim 1, wherein the executing of the picture quality adjustment includes executing picture quality adjustment using a predetermined standard parameter value set if the parameter file does not have stored therein a parameter value set designated for printing of the target image.

7. A method of processing target image data representing a target image, for the purpose of printing the target image according to any of a plurality of output modes that are dependent at least upon a print medium to be used, the method comprising:
- (a) providing a parameter file that stores a plurality of parameter value sets in association with the plurality of output modes, respectively, each parameter value set including a plurality of picture quality adjustment parameters;
- (b) acquiring one parameter value set from the parameter file according to output mode information indicating one output mode to be used at the printing of the target image;
- (c) executing picture quality adjustment of the target image data, using the acquired parameter value set; and
- (d) generating print data by converting the quality-adjusted target image data into data of ink amounts according to a type of print medium corresponding to the output mode to be used at the printing, wherein the picture quality adjustment is executed such that a degree of approximation in appearance among a plurality of first output images is higher than a degree of approximation in appearance among a plurality of second output images, the plurality of first output images each being an output image printed in each of the plurality of output modes after performing picture quality adjustment on the target image data using a parameter value set corresponding to each of the plurality of output modes, the plurality of second output images each being an output image printed in each of the plurality of output modes after performing a same given picture quality adjustment on the target image data regardless of the output mode.

8. A method of processing target image data representing a target image, for the purpose of printing the target image according to any of a plurality of output modes that are dependent at least upon a print medium to be used, the method comprising:
- (a) providing a parameter file that stores a plurality of parameter value sets in association with the plurality of output modes, respectively, each parameter value set including a plurality of picture quality adjustment parameters;
- (b) acquiring one parameter value set from the parameter file according to output mode information indicating one output mode to be used at the printing of the target image;
- (c) executing picture quality adjustment of the target image data, using the acquired parameter value set;
- (d) generating print data by converting the quality-adjusted target image data into data of ink amounts according to a type of print medium corresponding to the output mode to be used at the printing; and
- (e) producing layout image data for representing a layout image including a plurality of target images represented by a plurality of sets of the target image data, laid out in a predetermined area, wherein the acquiring of the one parameter value set includes acquiring one parameter value set for each of the plurality of sets of target image data,
the executing of the picture quality adjustment includes executing picture quality adjustment on each of the plurality of sets of target image data using the parameter value set for each of the plurality of sets of target image data, and
the layout image data is produced using the plurality of sets of target image data after the picture quality adjustment.

9. A method of processing target image data representing a target image, for the purpose of printing the target image according to any of a plurality of output modes that are dependent at least upon a print medium to be used, the method comprising:
- (a) providing a parameter file that stores a plurality of parameter value sets in association with the plurality of output modes, respectively, each parameter value set including a plurality of picture quality adjustment parameters;
- (b) acquiring one parameter value set from the parameter file according to output mode information indicating one output mode to be used at the printing of the target image;
- (c) executing picture quality adjustment of the target image data, using the acquired parameter value set;
- (d) generating print data by converting the quality-adjusted target image data into data of ink amounts according to a type of print medium corresponding to the output mode to be used at the printing;
- (e) generating an image data set including image data after the picture quality adjustment and adjustment completed information indicating that the picture quality adjustment for the image data has been completed, in such a manner that the image data and the adjustment completed information are associated with each other; and
- (f) providing the image data set as the target image data, wherein the executing of the picture quality adjustment includes determining whether the adjustment completed information is present for the target image data, and prohibiting the picture quality adjustment on the target image data in the executing of the picture quality adjustment if the adjustment completed information is present for the target image data.

10. An image processing device for processing target image data representing a target image, for the purpose of printing the target image according to any of a plurality of output modes that are dependent at least upon a print medium to be used, the image processing device comprising:
- a memory having pre-stored therein separately from the target image data a parameter file that stores a plurality of parameter value sets in association with the plurality of output modes, respectively, each parameter value set including a plurality of picture quality adjustment parameters;
- a parameter value acquiring module configured to acquire one parameter value set from the parameter file according to output mode information indicating one output mode to be used at the printing of the target image;
- a picture quality adjusting module configured to execute picture quality adjustment of the target image data, using the acquired parameter value set; and
- a print data generating module configured to generate print data by converting the quality-adjusted target image data into data of ink amounts according to a type of print medium corresponding to the output mode to be used at the printing, wherein the parameter value acquiring module is further configured to acquire the one parameter value set from the parameter file according to processing characteristic information established for the picture quality adjustment of the target image as well as the output mode information.

11. A computer program product for processing target image data representing a target image, for the purpose of printing the target image according to any of a plurality of output modes that are dependent at least upon a print medium to be used, the computer program product comprising:
- a computer readable medium; and
- a computer program stored on the computer readable medium, the computer program including:
- a first computer program code for causing a computer to acquire one parameter value set from a parameter file according to output mode information indicating one output mode to be used at the printing of the target image: the parameter file storing a plurality of parameter value sets in association with the plurality of output modes, respectively, each parameter value set including a plurality of picture quality adjustment parameters;
- a second computer program code for causing the computer to execute picture quality adjustment of the target image data, using the acquired parameter value set; and
- a third computer program code for causing a computer to generate print data by converting the quality-adjusted target image data into data of ink amounts according to a type of print medium corresponding to the output mode to be used at the printing,
- wherein the first computer program code causes the computer to acquire the one parameter value set from the parameter file according to processing characteristic information established for the picture quality adjustment of the target image as well as the output mode information.

12. A method of processing target image data representing a target image, using a first and a second image processing module having same picture quality adjusting modules, for the purpose of printing the target image according to any of a plurality of output modes that are dependent at least upon a print medium to be used, the method comprising:
(a) providing a parameter file that can be utilized in common by the first and second image processing modules, the parameter file storing a plurality of parameter value sets in association with the plurality of output modes, respectively, each parameter value set including a plurality of picture quality adjustment parameters;
(b) executing, by the first image processing module, a process utilizing the target image data as a processing target to create intermediate image data; and
(c) executing, by the second image processing module, a process utilizing the intermediate image data as a processing target,
wherein the executing of the process by the second image processing module includes:
(c1) if the first image processing module has executed picture quality adjustment by the picture quality adjusting module in the executing of the process by the first image processing module, prohibiting execution of picture quality adjustment by the picture quality adjusting module provided to the second image processing module.

13. An image processing device for processing target image data representing a target image, for the purpose of printing the target image according to any of a plurality of output modes that are dependent at least upon a print medium to be used, the image processing device comprising:
- a first image processing module comprising a first picture quality adjusting module;
- a second image processing module comprising a second picture quality adjusting module identical to the first picture quality adjusting module; and
- a memory, accessible from the first and second image processing modules, for pre-storing a parameter file separately from the target image data, the parameter file storing a plurality of parameter value sets in association with the plurality of output modes, respectively, each parameter value set including a plurality of picture quality adjustment parameters;

wherein the first image processing module executes a process utilizing the target image data as a processing target to create intermediate image data,
the second image processing module executes a process utilizing the intermediate image data as a processing target, and
the second image processing module prohibits execution of picture quality adjustment by the second picture quality adjusting module if the first image processing module has executed picture quality adjustment by the first picture quality adjusting module.

14. A computer program product for processing target image data representing a target image, using a first and a second image processing module having same picture quality adjusting modules, for the purpose of printing the target image according to any of a plurality of output modes that are dependent at least upon a print medium to be used, the computer program product comprising:
- a computer readable medium; and
- a computer program stored on the computer readable medium, the computer program including:
- a first computer program code for causing a computer to execute a process utilizing the target image data as a processing target to create intermediate image data; and
- a second computer program code for causing the computer to execute a process utilizing the intermediate image data as a processing target,
- wherein the processes by the first and second program codes includes a same picture quality adjustment function, and
- the second computer program code includes a program code for causing the computer to invalidate the picture quality adjustment function of the second computer program code if the picture quality adjustment function of the first program code has been exercised on the target image data.

15. A method of performing picture quality adjustment of target image data representing a target image, comprising:
(a) installing onto a computer an application program having a picture quality adjustment module;
(b) installing onto the computer a printer driver having a same picture quality adjustment module as that of the application program and a print data generating module configured to generate print data by converting the target image data into data of ink amounts, the target image data having been adjusted by one of the picture quality adjustment modules;
(c) performing picture quality adjustment by the picture quality adjustment module using one of the application program and the printer driver selected by a user; and
(d) generating print data by the print data generating module;
wherein the installing of the printer driver includes installing on the computer, while assigning a parameter file name recognizable by the picture quality adjustment module, a parameter file utilizable in common by the application program and the printer driver, the parameter file storing a plurality of parameter value sets in association with a plurality of output modes that are dependent at least upon a print medium to be used, each parameter value set including a plurality of picture quality adjustment parameters, in the performing of the picture quality adjustment, one parameter value set is used in the picture quality adjustment, the one parameter value set being acquired from the parameter file according to processing characteristic information established for the picture quality adjustment of the target image and output mode information indicating one output mode to be used at printing of the target image, and in the generating of the print data, the converting of the target image data into data of ink amounts is executed according to a type of print medium corresponding to the one output mode to be used at the printing of the target image.

16. A method according to claim 15 further comprising:
(e) updating the parameter file without updating the application program and the printer driver.

* * * * *